United States Patent Office 3,375,726
Patented Apr. 2, 1968

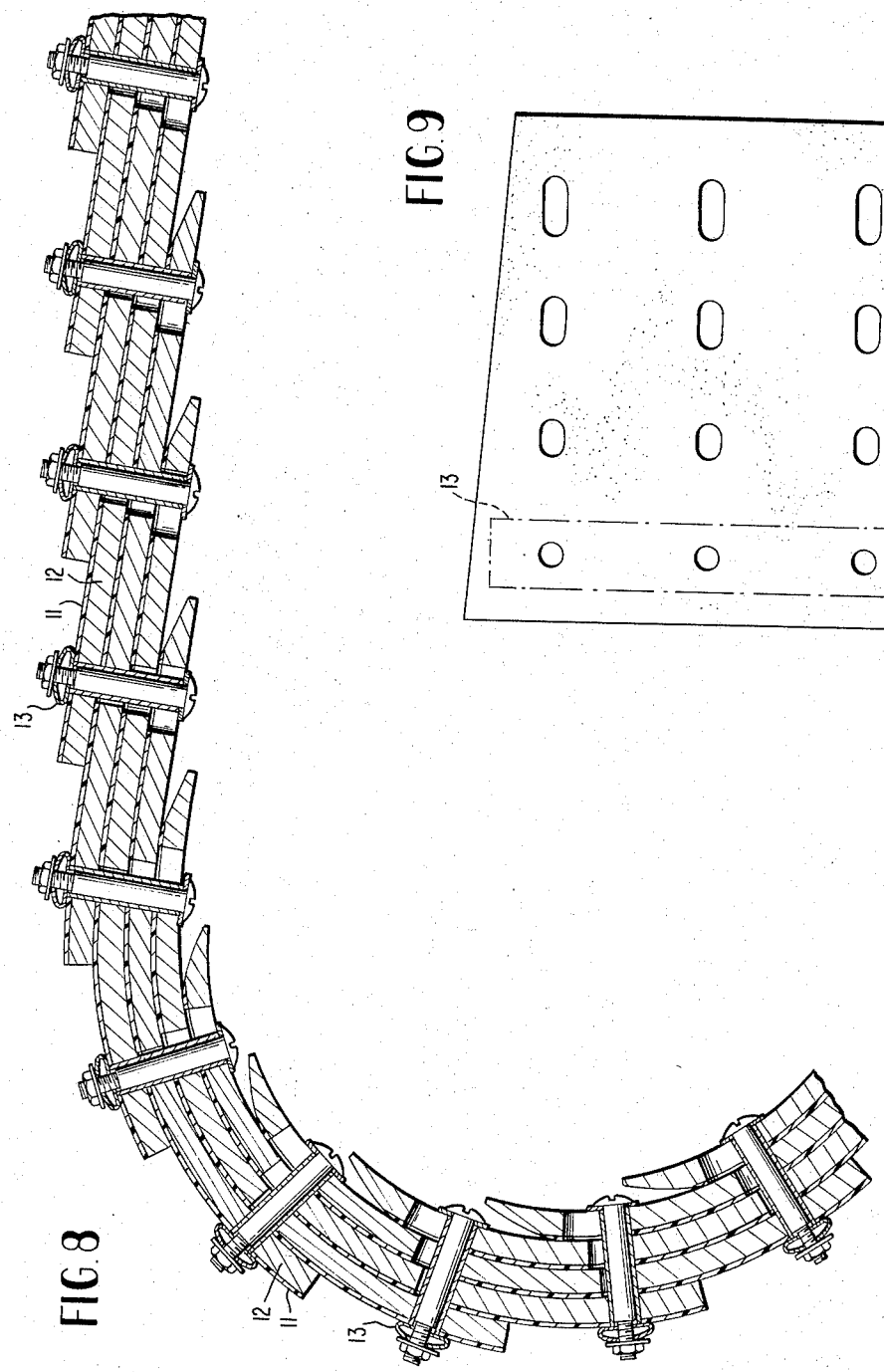

3,375,726
BELTING
Charles William Jones and Jeffery Charles Jones, both of 85 Domonic Drive, New Eltham, London, SE. 9, England
Filed July 1, 1965, Ser. No. 468,763
Claims priority, application Great Britain, July 1, 1964, 27,093/64
6 Claims. (Cl. 74—233)

ABSTRACT OF THE DISCLOSURE

A laminated link type V-belt is composed of individual links having connecting means disposed through slots cut in the links, the slots being elongated so that the connecting means passing therethrough will exert and take its full and true share of the load transmitted through each link. A connecting means is fixed to one end of each link and the elongation of the slots increases with increasing distance of the slots from the fixed connecting means.

---

Figure 1:
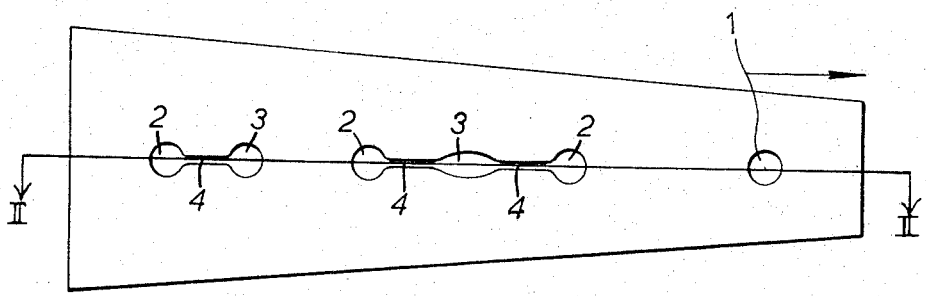

The present invention relates to laminated link type V-belting in which the individual portions of the lamina are suitably connected to each other by conventional studs or the like and preferably by a screw, tube, and locking nut. In the present invention the belt has much improved flexibility and tractive power with a substantially increased belt life especially on high speed small diameter pulleys. The present invention is applicable to conventional V-belt drives, cross (figure eight) V-belt drives, serpentine V-belt drives and variable speed V-belt drives, each using either the conventional laminated link type V-belting, reversible laminated link type V-belting, variable speed laminated link type V-belting or the traditional endless solid type V-belts and hexagonal section endless solid type double V-belt.

According to the present invention there is provided a link for use in a laminated link-type V-belt having a plurality of slots therein elongated along the longitudinal axis of the link through which connecting means may pass, the slots being of sufficient dimension to allow all the connecting means passing through the link to take their full share of load when a plurality of such links are constructed as a belt while eliminating substantially all internal mechanical stresses and having at least one connecting means fixed to one end of the link.

According to the present invention there is also provided a laminated link type V-belt which comprises a plurality of links, each of the links having a plurality of slots therein elongated in the direction of the longitudinal axis of the link through which a connecting means is disposed, the slots being of sufficient dimension to allow all the connecting means passing through each link to move freely longitudinally along the slot when the belt is engaged or riding within the pulley groove, and engaged by one end of the slot in that portion of belting between the two pulleys on the tight side of the drive, so that connecting means through the links will exert and take its full and true share of the load transmitted through each link.

The connecting means may be a conventional stud which is rigidly attached to the wide end (generally known previously as the Nose end) of the link, and is secured to the link so that the head of the stud is directed down through the links below (this direction being opposite to the conventional method). The wide end of the link, will preferably be the end of the link opposite to the direction of rotation of the drive.

The connecting means is preferably a screw, tube, and lock nut with appropriate washers. This arrangement tends to eliminate any unnecessary squeezing of the material of the links, thereby enabling freedom of movement between relative links. Preferably a D-shaped tube, disposed laterally, should be used to increase the resistance to side pressure when the belt is within the V-groove, especially when the belt is extra wide and has more than one row of studs longitudinally. The fabric of each link will then lie laterally more correctly flat when the belt is under load and contained within the pulley grooves. An alternative arrangement which also eliminates any unnecessary squeezing of the material of the links comprises a screw passing through a tube which abuts one surface of the link, and terminates in a locking nut which is disposed on the opposite surface of the link from the tube and is spaced from the surface by a steel washer and a fibre washer, the steel washer being adjacent the nut and the fibre washer adjacent the surface of the link.

Reinforcing links manufactured from modern material, i.e., woven nylon coated with neoprene rubber or other suitable plastics material especially those plastics having a very low coefficient of friction may be introduced between the links to increase the mechanical strength of the belt. These reinforcing links must be cut in the same pattern as the adjacent links forming the V-belt or belting, so contributing to the increased load carrying capacity without interfering with the required flexibility.

Figure 2:
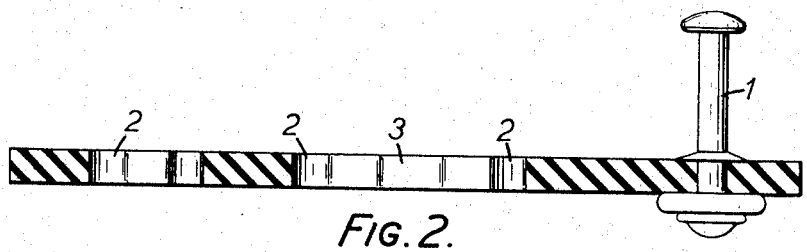
Figure 3:
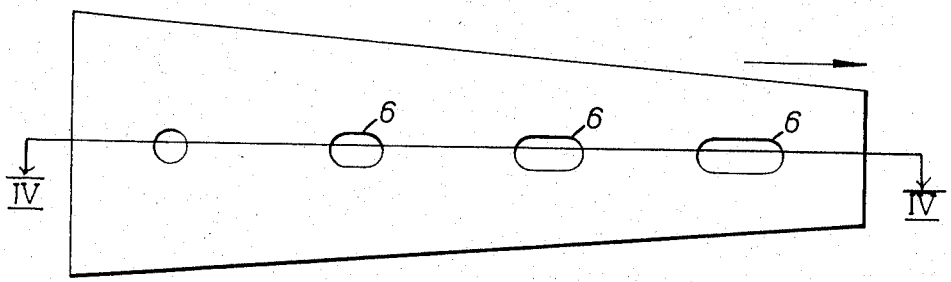
Figure 4:
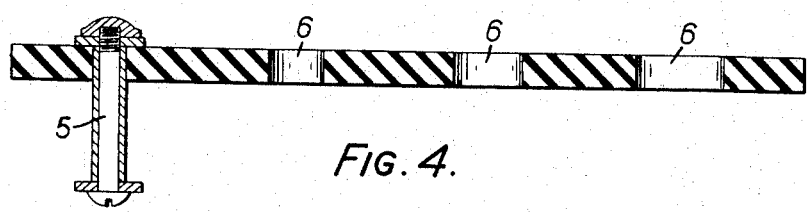
Figure 5:
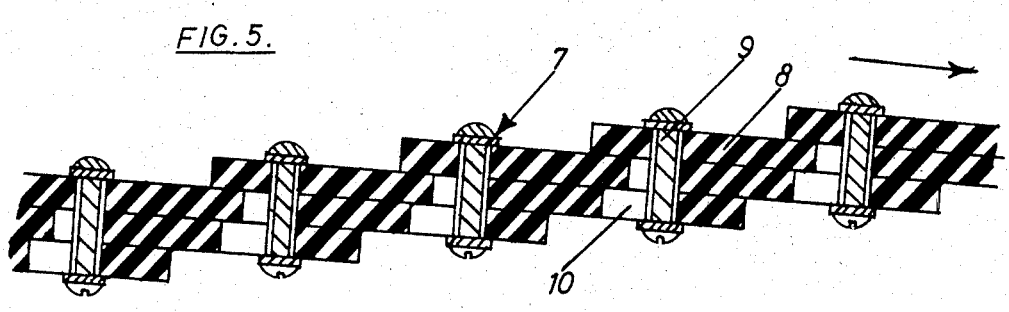
Figure 6:
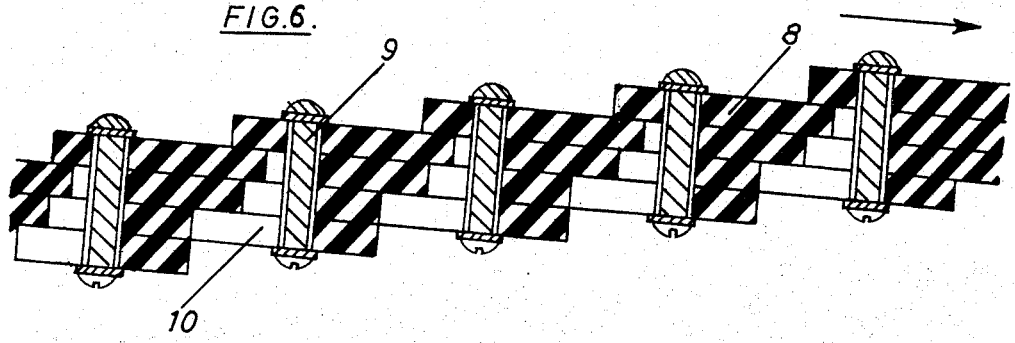
Figure 7:
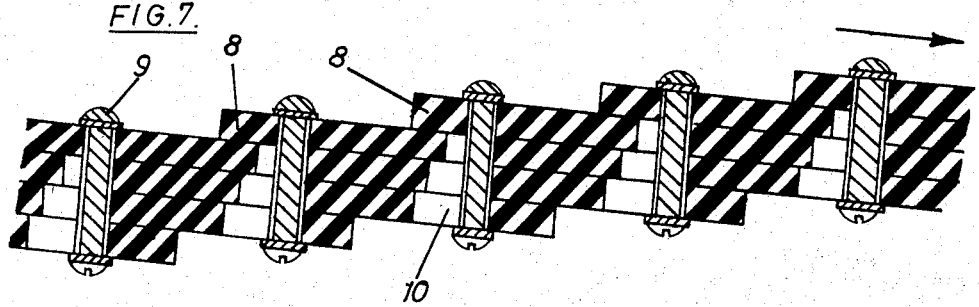

The invention is further illustrated, by way of example, in the accompanying drawings, in which:

FIG. 1 represents the plan view of a conventional link for use in a 4-link laminated link type V-belt, FIG. 2 is a side elevation, shown in section, along the line II—II of FIG. 1, FIG. 3 represents a plan view of a link for use in a 4-link laminated link type V-belt according to the present invention, FIG. 4 represents a side elevation, shown in section taken along the line IV—IV of FIG. 3, FIG. 5 illustrates a side elevation in section of a 3 link belt according to the invention suitable for use on a 6" pitch circle diameter pulley, FIG. 6 illustrates a side elevation in section of a 4-link belt according to the invention suitable for use on a pulley having a six inch pitch circle diameter, and FIG. 7 illustrates a side elevation in section of a 4-link belt according to the invention suitable for use on a pulley having a twelve inch pitch circle diameter.

FIG. 8 is a sectional view of a belt according to the invention, showing portions thereof in an arcuate shape and portions thereof in a linear orientation, and FIG. 9 is a plan view of a single link from the belt shown in FIG. 8, having openings for plural longitudinally oriented rows of connecting means.

Referring now to the drawings, in the conventional link illustrated in FIGS. 1 and 2 the stud 1 is fixably mounted to the link at the narrow end thereof. The narrow end generally moves in the direction of rotation of the drive as indicated by the arrow. The conventional link has connecting holes 2 through which studs from adjacent links pass. In order to facilitate engaging the studs in the holes 2, elongated or enlarged holes 3 are provided with slits 4 to enable stud 1 to be threaded into position in hole 2. In the conventional belt the stud head extends outwardly from the innermost link of the belt through to the outside link of the belt. The links are of identical construction. The studs 1 of the conventional laminated link type V-belt do not carry their true proportion of the load transmitted through each link, when the belt is in a load carrying position i.e. on the pulley, thereby contributing to a loss in efficiency. In a four link belt, the stud passing through the first hole pushes hard against the fabric, while in the second hole the stud is quite free. In the third hole (the outer layer) the fabric is pulled against the stud rather than the stud push the fabric. It will therefore be seen that this is an inefficient method. Thus when the conventional laminated link type V-belt is riding within the pulley groove internal mechanical stresses are created which in turn reduce considerably the belt life potential. Broadly speaking when that portion of a conventional laminated link type V-belt is between two pulleys on the tight side of a V-drive, and when the nose or wide end of the link is moving in the direction of rotation, the stud of that link pulls the nose end of another link forward and that part of the stud shank between tends to move backwards (i.e., opposite to the direction of rotation) into slit 4 of the adjacent link between the above mentioned links, and another part of the stud shank is pivoted on solid fabric of hole 2 of the third link below, so curling longitudinally the fabric of the bottom or fourth link to which this stud is fixably mounted.

A similar but greater process of destruction is created when a conventional laminated link type V-belt is riding inside a V-pulley groove, and is aggravated tremendously when pulleys have minimum or even smaller diameters. The restrictions created by the sides of the pulley groove also cause internal mechanical stresses to stretch the fabric beyond endurance between the holes 2. Under conditions where minimum or smaller diameter pulleys are in use at high speeds a premature breakdown of the belts can be taken as an indication that the stud is under a much greater stress than the belt was designed to carry, and the final premature breakdown of the belt is due to a fracture in the fabric and/or the stud. Primarily it is essential to design drives with reference to a satisfactory rating table especially when it is necessary to consider any very high speed small diameter pulley drives. Unfortunately the officially recognized rating tables which exist are not satisfactory. Many drives exist and conform to these recognized rating tables, yet the life potential of the belts varies from a very few days to a very few weeks, though other drives having larger diameter pulleys at lower speeds and conforming to the same rating table have a very satisfactory belt life potential of a few years.

Conventional laminated link type V-belting is customarily prestretched before dispatch. This process while improving its flexibility detracts considerably from the inherent strength of the fabric and seriously effects the belt life potential when belts are fitted on small diameter pulleys which extend still further the stretch already evident in the link pitch length of the conventional laminated link type V-belting before it is fitted for use.

On the link illustrated in FIGS. 3 and 4 forming the laminated link type V-belt of the present invention, a screw tube, and lock nut 5 are provided (or other connecting means) at the wide end of the link opposite to the direction of rotation of the drive which is indicated by the arrow and extends inwardly through the links underneath which are of identical construction to the inside link of the belt. Belts containing 3 or 4 links are the most common. (See FIGS. 5, 6 and 7.) The link illustrated is one for use in a 4-link belt.

The link is provided with slots 6 which are extended longitudinally as compared with the slots in a conventional link towards the wide end of link in the direction opposite to the direction of rotation of the belt. The slots 6 are of increasing dimensions from the wide end in the direction of rotation of the drive to the narrow end. The dimensions allow each of the connecting means to have its full freedom of movement longitudinally within slots 6, so increasing the flexibility of the complete belt. The dimensions of the slots are calculated for each particular belt.

The calculations are based on the thickness of the belt, the outside diameter of the pulley over which the belt runs, the link pitch length i.e. the distance between the centre of the connecting means and the centre of the first hole before elongation and is therefore a constant for each particular link and an experimental factor. The holes are equally spaced. The elongation E is therefore given for each particular slot by the formula:

$$E = 2xt \times 1/O.D. \times l \times f$$

wherein $t$ is the thickness of the belt (i.e. the thickness of each individual link × number of links),
O.D. is the outside diameter of the pulley,
$l$ is the link pitch length, and
$f$ is the experimental factor.

The experimental factor $f$ has been found to be 1.7 for the slot farthest from the connecting means hole. The factor for the slot adjacent the end slot is half this value i.e. 0.85 and for the next hole (if one is present i.e. in a 4 or more link belt) is half as much again i.e. 0.425.

If it is proposed to use the conventional stud such as is illustrated in FIGS. 1 and 2, then slots 6 are further extended longitudinally and/or made pear shape (in the direction opposite to the direction of rotation of the belt when fitted on the drive) in order to facilitate engagement of the stud in slots 6. It is generally advisable for slots 6 to be slightly longer than is necessary in order to ensure absolute freedom of movement of the connecting means. For instance the conventional laminated three-link type V-belt size $21/32''$ × 40° for use in a "B" section V-groove has a link pitch length of $13/16''$; this link pitch length creates a difficulty when the belt is riding in the grooves of minimum diameter pulleys insofar as the resistance to flexing caused by the overlong tail of the link induces tremendous internal mechanical stresses which in turn decreases the life potential of the belt considerably. An improvement in performance will result by increasing the link pitch length from $13/16''$ to at least $7/8''$ and it would be possible to increase the link pitch length to $15/16''$ and still be strong enough to transmit a greater load than conventional laminated link type V-belting.

The link illustrated in FIGS. 3 and 4 forming a four-link laminated link type V-belt of the present invention, having three longitudinally extended slots 6 offers four positive points of reaction to the four connecting means disposed through the link, whereas only three of the four holes 2 in the conventional link illustrated in FIGS. 1 and 2 offers a positive point of reaction.

Referring now to FIG. 5, a three-link belt 7 is constructed of a plurality of identical links 8. Each link 8 is provided with a connecting means 9 which passes downwardly through slots 10 in the links and terminates at the inside surface of the belt. The slots 10 are constructed as shown in FIG. 3. The direction of travel of the belt is indicated by the arrow.

FIGS. 6 and 7 illustrate similar belts except that the connecting means 9 passes downwardly through 4 links. In FIG. 7 the slots 10 are of smaller dimension since a larger pulley is employed. It will be seen from FIGS. 5 to 7 that when the belt is moving freely between two pulleys, the connecting means 9 abuts one end of the slots 10 so that each link associated with any of the connecting means 9 will take its full share of the total load. When the belt is moving around a pulley as shown in FIG. 8, the connecting means 9 moves freely in the respective slots 10, thus permitting relative movement between the adjacent links and avoiding excessive wear.

The connecting means 9 is a screw, tube and lock nut arrangement similar to that illustrated in FIG. 3.

The specific embodiment shown in FIG. 8 operates on the same principle as those shown in FIGS. 5–7 but is modified to the extent that there are thin reinforcing links 11 located between the links 12 of the belt. The reinforcing links are fabricated of woven nylon covered with a plastic material. This view also illustrates the laterally oriented D-shaped tubes 13 which increase the resistance of the belt to side pressure when the belt is riding within a V-groove of a pulley.

As seen in FIG. 9, each link in the belt of FIG. 8 is provided with plural rows of hole and slot openings which receive the connecting means. In this view, the position of one of the D-shaped tubes 13 is illustrated in broken lines.

The main advantages of the laminated link type V-belt of the present invention over the conventional V-belt are:

*Flexibility:* Size for size it is more flexible than conventional V-belts.

*Load carrying capacity* is appreciably increased on all drives, especially on high speed small diameter pulleys.

*Belt life potential* is increased substantially on all applications and by as much as 10 to 50 times on high speed minimum diameter pulleys. This is due to the fact that the thickness of a conventional V-belt is reduced in proportion to the number of links embracing each connecting means for example, a conventional laminated 3-link type V-belt having ½" overall thickness of fabric virtually becomes by use of the present invention three separate and independent links ⅙" thick, thereby increasing the flexibility and reducing the side friction of the belt.

*Fittings and maintenance adjustments.*—It will not be necessary to fit new belts as tight as the conventional laminated link type V-belting, as belting of the present invention will not be prestretched when being manufactured and being so flexible will allow belting prepared with fabric in its unstressed conditions to handle all the normal tension loads expected in a well designed drive using correctly proportioned rating tables. The periods of time between customary maintenance adjustments will be greatly increased especially on high speed minimum diameter pulley drives. It will also be possible to increase substantially the maximum belt speeds that are now normally accepted as the satisfactory limit for conventional laminated link type V-belting.

*Production costs* should be less than is normal as the prestretching process will be eliminated; in addition there should be a greater footage of belting produced for the same quantity of material required in the manufacture of the conventional laminated link type V-belt.

The invention is further illustrated with reference to the following examples.

*Example 1*

A laminated link type V-belt having 4 links each ¼" thick with connecting means ¼" diameter was constructed for use on a 7" O.D. pulley. The link pitch length was 1.5". The dimensions of the first hole at the wide end of the link opposite to the direction of rotation of the belt, was ¼" diameter, the second hole was elongated ³⁄₁₆" forming a slot, the third hole was elongated ⅜" forming a slot, and the fourth hole at the narrow end of the link in direction of rotation of the belt was elongated by ¾" forming a slot.

*Example 2*

The same size of belt as in Example 1 was produced for use on a larger pulley diameter, of 13" O.D. The dimensions of first hole were the same, i.e., ¼" diameter, the second hole was elongated by ³⁄₃₂", the third hole elongated by ³⁄₁₆", and the fourth hole was elongated by ⅜".

*Example 3*

A 3-link belt was constructed having an overall thickness of ½" from links having a link pitch length of ⅞" for use on a 5" O.D. pulley, the tail slot was elongated by ¹⁹⁄₆₄" and the middle slots was elongated by ¹⁹⁄₁₂₈".

*Example 4*

A 4-link belt was constructed having an overall thickness of 1" from links having a link pitch length of ½" for use on a 10" O.D. pulley. The tail slot was elongated by ³³⁄₆₄", the second slot towards the wide end of the link was elongated by ¹⁷⁄₆₄" and the third slot towards the wide end of the link was elongated by ⁹⁄₆₄".

The calculations of elongation in Examples 1 to 4 were based on the formula outlined above. The belts were found to be flexible and have a much longer life than a normal conventional V-belt.

*Example 5*

This example illustrates the greater load carrying capacity of the laminated link type V-belting formed from the links of the present invention and those of the prior art, two identical belts were produced from links according to the present invention and from the prior art links. The fabric and the link pitch lengths in both cases were identical. The tails of each link were 16⅝% shorter in the laminated link type V-belt of the present invention compared with the belt of conventional constructions. A conventional machine drive conforming to British Standard 1440/1962 of the British Standards Institution Specification, was constructed having a 7½ H.P. motor 2880/2880 r.p.m. and having 5½" outside diameter pulleys grooved for four "B" section standard rayon cord endless (solid) V-belts rated as being capable of transmitting 8.9 H.P. In actual practice these V-belts averaged only five weeks (3–8 hour shifts per day) of belt life before final failure. The drive had fairly rapid intermittent loading, between 2⅜ H.P. light and 4½ H.P. heavy, but the drive had about 5 severe starts and stops per 8 hour shift and the starting torque is 47¼ H.P. A conventional laminated link type V-belt lasted only a few days, but the laminated link type V-belts constructed from links according to the present invention of Examples 1 to 4 were still performing satisfactorily 3 months after first fitting to the drive, showed no signs of distress, and the stretch in the fabric was negilgible. Further there was no evidence of any heat being present in the belt of the present invention or pulleys.

*Example 6*

A 5 H.P. drive, high starting torque 2880/2880 r.p.m. with 4 conventional laminated link type V-belts on 5½" outside diameter pulleys had a very short belt life potential of 3 weeks. A belt formed from the links of the present invention on the same drive and using identical fabric had a belt life of 104 to 156 weeks. Alterations in the nature and thickness of the fabric plus reinforcing links could build up the load carrying capacity of the drive to the point where it should be possible to transmit via the same number and section of belts 10–15 H.P. under the same conditions, without changing the existing pulleys.

We claim:

1. A laminated link type V-belt for passing over a pulley, comprising a plurality of individual links connected together by connecting means, each of said links having a trailing end and a leading end which is narrower than the trailing end and adapted to be disposed from the trailing end in the direction of belt travel, each link having toward its trailing end a hole which has a dimension measured longitudinally of the belt which is equal to the dimensions of the connecting means measured longitudinally of the belt, each link having at least two slots which are spaced from the hole in that link in a direction toward the leading end of the link and which have greater dimensions measured longitudinally of the belt than said hole, the slots in each individual link having dimensions measured longitudinally of the belt which are equal to that of the connecting means plus an additional distance, this additional distance being progressively greater toward the leading end of each individual link, each of said connecting means extending through aligned openings in at least three links including a hole in one link and slots of progressively greater dimensions measured longitudinally of the belt in other links; the slots being positioned and elongated such that said connecting means is capable of moving freely longitudinally with respect to the belt along its respective slots when the belt is arcuately engaged around a pulley and, while the belt is in a linear shape, the connector means lies against the slot end which is located toward the leading end of the individual link so that there will be a force-transmitting relationship between each connecting means and the plural links through which it passes.

2. The laminated link type V-belt defined in claim 1 characterized in that said connecting means is a bolt disposed within a tube and locked with a nut.

3. The laminated link type V-belt defined in claim 1 characterized in that more than one row of connecting means are disposed longitudinally of the belt and said connecting means has a D-shaped tube incorporated laterally of the belt.

4. The laminated link type V-belt defined in claim 1 characterized in that a thin link of woven nylon covered with a plastic material is disposed between each link.

5. In combination, a pulley and the laminated link type V-belt defined in claim 1 characterized in that the said additional distance of the slots in each link is equal to $$2tlf/O.D.$$

$t$ is the thickness of the belt;
O.D. is the outside diameter of the pulley over which the belt is intended to ride or the smallest pulley of more than one is used;
$l$ is the link pitch length; and
$f$ is an experimental factor which is 1.7 for the slot farthest from the trailing end and is successively divided by 2 for the other slots in the direction of the trailing end.

6. A laminated link type V-belt comprising a plurality of superposed generally parallel links of substantially equal length, said links having end portions which are longitudinally offset in a same direction from end portions of adjacent links, said superposed links having mutually aligned apertures extending therethrough, connector means extending through said aligned apertures in said superposed links, those apertures receiving each connector having dimensions aligned with the longitudinal axis of the belt which increase progressively from the outermost said superposed link to the innermost said superposed link.

References Cited

UNITED STATES PATENTS 2,848,901   8/1958   Groff _____ 74—233

FOREIGN PATENTS 616,653   1/1949   Great Britain.
901,643   8/1945   France.
1,101,817   4/1955   France.

FRED C. MATTERN, JR., *Primary Examiner.*

DAVID J. WILLIAMOWSKY, *Examiner.*

J. A. WONG, *Assistant Examiner.*